United States Patent [19]

Botts et al.

[11] Patent Number: 4,572,285
[45] Date of Patent: Feb. 25, 1986

[54] MAGNETICALLY FOCUSED LIQUID DROP RADIATOR

[75] Inventors: Thomas E. Botts, Fairfax, Va.; James R. Powell, Shoreham, N.Y.; Roger Lenard, Redondo Beach, Calif.

[73] Assignee: The United States of America as represented by the Department of Energy, Washington, D.C.

[21] Appl. No.: 679,841

[22] Filed: Dec. 10, 1984

[51] Int. Cl.$^4$ ............................................. F28D 15/00
[52] U.S. Cl. .................................. 165/104.28; 165/41; 165/104.31; 165/904; 165/104.23; 62/467; 244/163
[58] Field of Search ............... 165/41, 104.31, 104.28, 165/104.23, DIG. 6; 62/467, DIG. 1; 244/158 A, 163, 117 A; 55/3, 100

[56] References Cited

U.S. PATENT DOCUMENTS

| | | | |
|---|---|---|---|
| 3,239,164 | 3/1966 | Rapp | 244/117 A |
| 3,363,676 | 1/1968 | Hunter, Jr. | 165/86 |
| 3,490,718 | 1/1970 | Vary | 244/163 |
| 3,608,718 | 9/1971 | Aubrey, Jr. | 55/100 |
| 4,458,148 | 7/1984 | Hirshfield | 55/100 |

Primary Examiner—Albert W. Davis, Jr.
Attorney, Agent, or Firm—Vale P. Myles; Paul A. Gottlieb; Judson R. Hightower

[57] ABSTRACT

A magnetically focused liquid drop radiator for application in rejecting energy from a spacecraft, characterized by a magnetizable liquid or slurry disposed in operative relationship within the liquid droplet generator and its fluid delivery system, in combination with magnetic means disposed in operative relationship around a liquid droplet collector of the LDR. The magnetic means are effective to focus streams of droplets directed from the generator toward the collector, thereby to assure that essentially all of the droplets are directed into the collector, even though some of the streams may be misdirected as they leave the generator. The magnetic focusing means is also effective to suppress splashing of liquid when the droplets impinge on the collector.

17 Claims, 6 Drawing Figures

MAGNETICALLY FOCUSED LIQUID DROP RADIATOR

The U.S. Government has rights in this invention pursuant to Contract Number DE-AC02-76CH00016, between the U.S. Department of Energy and Associated Universities Inc.

BACKGROUND OF THE INVENTION

The invention relates to lightweight heat radiating apparatus that is useful in spacecraft for ejecting heat energy from such craft into space. More particularly, the invention relates to a liquid droplet radiator that contains magnetic means for focusing a sheet of liquid droplets as it flows between a droplet generator and a collector, thereby to improve the efficiency with which the collector operates, while maintaining the overall weight of the collector desirably low.

One of the more pressing thermal management problems confronting designers of large, complex and more powerful spacecraft of the future is the need to reject energy from the spacecraft's power cycles without ejecting mass into space. Typical heat energy generating power cycles in spacecraft include the refrigerators that are needed to keep cryogens in a liquid state (as well as to cool charged particle accelerators), high powered radar, large IR detector arrays, in addition to a wide range of other on-board cooling applications. The only means available for rejecting energy from a spacecraft without exhausting mass into space is to radiate the energy from the spacecraft into the colder ambient surrounding the craft.

It is desirable from a thermodynamic viewpoint to reject energy from a spacecraft at relatively low temperatures, therefore, very large radiating areas are ordinarily required. In many of the power cycles utilized on spacecraft, the peak temperatures are often fixed by materials limitations, thus, an increase in the energy rejection temperature can have an adverse impact upon the efficiency of the power cycle. Because of such considerations, the energy rejecting radiators historically utilized in spacecraft have comprised a massive part of their power system. In alternative system designs, spacecraft power systems have been designed to operate between fairly small temperature differences in order to reduce the size of radiators needed, however, that expedient results in the need to make all other components relatively large and unwieldy.

In the past, many different types of energy radiating devices have been designed in an attempt to overcome this dilemma between the need for a large energy radiating surface and the need to minimize the overall weight of an energy radiating system. Some of the concepts that have been pursued relatively recently as energy radiating mechanisms for use in spacecraft are radiator designs that utilize dust, moving belts, thin radiating tubes, heat pipes, and energy radiating droplets. All of those concepts have shown some promise for being maturable into acceptably lightweight energy radiating systems for application in spacecraft; however, an optimum energy radiating system for spacecraft is still needed. As spacecraft payloads continue to increase in size, this need will be heightened, due to the resultant increase in the more complex, more powerful and heavier management systems that will be added to such future craft.

The magnetically focused liquid droplet radiator of the present invention is believed to be a major advance over all known prior art systems that have been proposed for spacecraft application. One of the basic design constraints that must be dealt with in order to enable a liquid droplet radiator system to be applied in a spacecraft energy radiator is that the collector unit for such a system needs to have a very high efficiency. Losses of liquid coolant from the system must be limited to fractions of ppm (parts per million) in order to minimize both spacecraft contamination, and the need to minimize weight penalty resulting from having to provide makeup liquid coolant to the system. In a spacecraft application, losses of energy radiating coolant fluid can result from a wide range of events or conditions such as the following:

1. Directional dispersions of the liquid droplets as they leave the droplet generator.
2. Velocity dispersions of the droplets as they leave the droplet generator.
3. Electrical charge accumulations on the liquid droplets, which result in dispersions of the droplets due to Coulombic repulsion.
4. Evaporation of the liquid coolant.
5. Spacecraft accelerations.
6. Incident post radiation, which is capable of imparting random forces to the liquid droplets.
7. Splashing of the liquid droplets in the droplet collector of the system.
8. Random collisions between droplets distributed from the droplet generator.

Such losses of energy radiating fluid can be at least partly overcome with two different design approaches. First, a larger liquid droplet collector can be utilized in the radiator system to provide a bigger target within which randomly dispersed droplets can be collected. That approach has major disadvantages in terms of greater weight penalty, larger radar cross section, and other unattractive characteristics. Moreover, a larger collector does not guarantee that splashing would not continue to pose a potential loss mechanism. A second, more desirable approach is to provide a force field, which can be either electric or magnetic, and which can be applied to the liquid droplet particles in order to steer or focus them into a relatively small, light weight liquid droplet collector. The present invention utilizes a magnetic force field to achieve such focusing of a sheet of energy radiating droplets in a liquid droplet radiator system that is designed for spacecraft applications. In order to avoid inherent problems caused by; electrical charges present in a spacecraft, electric charge exchange within a liquid drop radiator, forces within a distributed sheet of energy radiating droplets which tend to blow it up, as well as other considerations, it is thought that the use of a magnetic flux field to focus the energy radiating sheet of a liquid drop radiator is more suitable for spacecraft application than use of an electric focusing field might be.

SUMMARY OF THE INVENTION

In one preferred embodiment of the invention a magnetically focused liquid droplet radiator is provided with a generator for generating directed streams of magnetizable liquid or slurry droplets, in a predetermined flow pattern, toward an associated droplet collector that is spaced from the generator. Conduit and pump means are operatively connected between the collector and droplet generator and are effective to withdraw liquid from the collector and recirculate it to the droplet generator. A magnetizable liquid or slurry is contained within the conduit and circulating pump system. Magnetic means are disposed adjacent to the collector for producing a magnetic flux field that is operable to focus and accelerate streams of liquid or slurry droplets as they approach the accelerator from the generator, thereby to direct the streams of droplets into the collector and to prevent excessive splashing of the droplets when they impact the collector.

OBJECTS OF THE INVENTION

A major object of the invention is to provide a liquid droplet radiator for spacecraft applications, which radiator includes magnetic focusing means for directing and accelerating liquid droplets into a relatively small, lightweight droplet collector within the radiator system.

Another object of the invention is to provide an ultra lightweight energy rejecting system for use in spacecraft.

A further object of the invention is to provide a lightweight droplet radiating system that efficiently rejects energy from the system while restricting loss of liquid from the radiating system to a fraction of ppm.

Yet another object of the invention is to provide a magnetically focused liquid droplet radiator wherein lightweight rare earth magnets are disposed around a relatively small, generally conically shaped liquid drop collector in order to magnetically focus a ferrofluid or ferrite slurry sheet of energy radiating droplets into the collector.

Additional objects and advantages of the invention will become apparent to those skilled in the art from the disclosure of it presented herein, considered in conjunction with the accompanying drawings.

DESCRIPTION OF THE PREFERRED EMBODIMENTS

Figure 1:
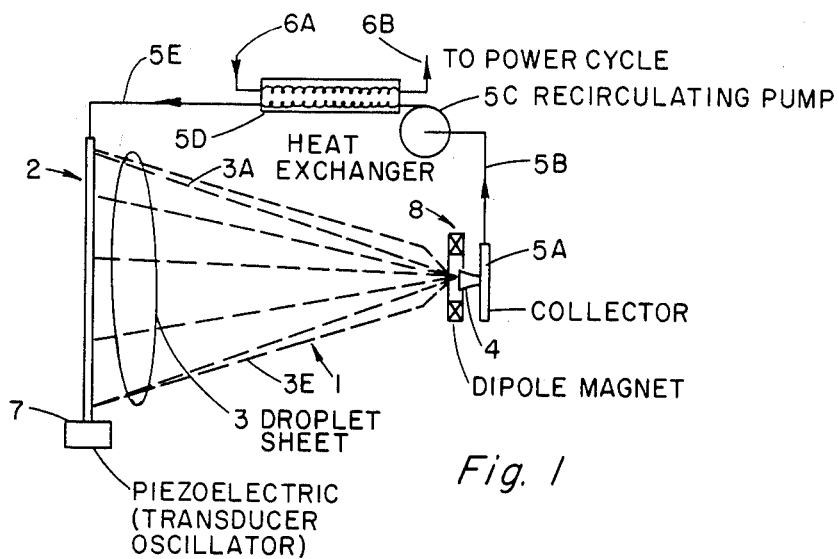
FIG. 1 is a schematic diagram of a liquid droplet radiator system that includes a liquid droplet generator for directing droplets toward a collector, a collector spaced from the generator for receiving the droplets, a conduit and pump system for withdrawing liquid from the collector and recirculating it under pressure to the generator, and a heat exchanger for coupling the recirculating conduit system in heat exchange relationship with a power cycle system of an associated spacecraft or other energy producing power cycle. According to the invention, a magnetic droplet focusing means is provided in combination with the collector for the purpose of focusing and accelerating droplets in the energy radiating sheet of droplets, so they will enter the relatively small collector with a minimum of splashing at the collector surface.

Referring first to FIG. 1 of the drawings, it will be seen that there is schematically illustrated a magnetically focused liquid droplet radiator system that is constructed according to the present invention, and that is suitable for application in rejecting heat energy from a spacecraft. Except as otherwise specifically described herein, it should be understood that the components of the liquid droplet radiator (LDR) systems described are suitable conventional, commercially available components. Thus, the LDR 1 illustrated in FIG. 1 comprises a droplet generator 2 that is effective for producing directed streams 3A-3E of droplets that define a generally planar droplet sheet 3. A collector 4 is mounted in spaced relationship from the droplet generator and is operable to collect the streams 3A-3E of droplets directed toward it in the droplet sheet 3, that is transmitted from the generator 2. Suitable fluid handling means 5A, 5B, 5C, 5D and 5E are operably connected for withdrawing fluid from the collector and delivering it to the generator 2 under pressure. In the arrangement of the invention shown in FIG. 1, the means 5A-5E, respectively, comprise in combination; a hollow tube 5A that is operably connected to receive liquid droplets which are withdrawn from the hollow base of the collector 4; a conventional hollow conduit, such as a pipe 5B, which is connected in liquid tight relationship to receive liquid from the tube 5A and conduct it to a suitable conventional zero gravity pump 5C, which is schematically illustrated as being operatively connected between the pipe 5B and a heat exchanger 5B. From the pump 5C, further suitable conventional conduit means 5E, which again may be sections of conventional pipe, are connected in said combination to deliver fluid from the pump through the heat exchanger to the generator. The heat exchanger 5D is connected to conduit sections 6A and 6B, which are effective to deliver fluid from an associated energy producing power cycle, so that the fluid can be cooled by its heat exchange relationship with fluid forced through the conduit 5E by the pump 5C.

To enable the generator 2 to produce liquid droplets, the generator 2 is mechanically connected to a piezoelectric oscillator 7, or to any other suitable electromechanical transducer means that is effective to vibrate the generator 2 at a desired frequency, thereby to form the streams of droplets 3A-3E that are produced by the generator 2. For example, a simple electromagnetically driven audio speaker may be appropriately mounted adjacent to a droplet generator, such as the generator 2, thereby to impact it with soundwaves of a given desired frequency. In such an arrangement, the soundwaves would be effective to cause the generator to vibrate and thus produce the desired streams of droplets.

Although the droplet collector 4 shown in FIG. 1 is depicted as a generally frusto-conical, hollow collector, it should be recognized that other forms of collectors, such as relatively shallow dish shaped or concave surfaced collectors may be used in practicing alternative embodiments of the invention.

According to a principle of the present invention, the LDR 1 is combined with the improvement comprising a selected magnetic means 8 that is disposed in operative relationship to the collector 4 and is effective to produce a magnetic flux field that extends from the longitudinal central axis of the collector 4 into areas located transversely outward from the outermost straight line droplet stream paths (3A and 3E) extending from the generator 2 generally toward the collector 4. That orientation of the flux field is effective to focus and accelerate the streams of droplets thereby to direct them from said transversely outward areas into the collector 4.

The characterizing improvements of the invention further include a magnetizable liquid or slurry (visible in FIG. 1 only in the streams 3A–3E in droplet sheet 3), which is provided in the generator 2 and the associated fluid handling means 5A–5E that are effective for withdrawing and circulating the liquid or slurry during normal operation of the LDR 1. Magnetic focusing of the droplet sheet 3, according to the principles of the present invention, requires use of a magnetizable liquid, or so called ferro-fluid, or use of a suitable ferrite slurry. Ferro-fluids are composed of suspensions of solid magnetic particles that are dispersed in a magnetically inert fluid. Typically such commercially available ferro-fluids utilize magnetic material particles that are on the order of 100 Angstroms in size, and include an organic surfactant which is often used in order to overcome particle agglomeration. Suitable commercially available ferro-fluids for use in practicing the invention can be obtained from Ferro-Fluids Corporation, of Burlington, Mass. In the preferred form of the invention shown in FIG. 1, a ferro-fluid designated EMG-901, which was obtained from that corporation, is recommended for use, and has been found to perform well in such an apparatus.

In the tests conducted by the present inventors on prototypes of LDR systems utilizing various magnetic focusing means and associated magnetizable liquids or slurries, they found no indication that coolant fluids having superior properties, for example better viscosity and boiling point characteristics then those of EMG-901, which would be more suitable for use in future LDRs, cannot be developed. For example, a simple mixture of mineral oil and iron filings was found to approximate a suitable ferro-fluid for several seconds, before separation of the iron filings and oil was observed in the presence of a magnetic field. At droplet sizes of approximately 200 microns, surface tension will hold the two components, i.e., the metal filings and the oil, together at accelerations up to about 1 g (1× force of gravity). Thus, those skilled in the art should recognize that various conventional ferro-fluids, oil-iron slurries and liquid metal ferro-fluids, such as mercury-ferride, NaK, and lithium may be used in various alternative embodiments of the magnetically focused LDR of the invention.

In the embodiment of the invention illustrated in FIG. 1, the magnetic means 8 comprises a toroidally shaped electro-magnet (shown in cross section) that is disposed partly around the collector 4 in generally coaxial relationship with it. In other arrangements of the invention, the magnetic means 8 may comprise at least one permanent magnet, which should similarly be disposed adjacent to the collector 4. In such an alternative configuration it will be understood that only one side of the droplet sheet 3 would be focused by a single magnet, thereby to cause the droplets to be accelerated into the collector 4 from only one side of the sheet 3. Thus, it is preferred that a plurality of dipolar permanent magnets be used in those configurations of the invention that do not employ a toroidal magnet disposed around the collector. When such a plurality of permanent magnets is used, they should be respectively disposed in spaced relationship to one another in an arrangement of magnets that at least partly surrounds the collector 4, in order to focus the maximum number of droplet streams 3A–3E into the collector. In considering the use of different types of magnet means for practicing alternative embodiments of the invention, those skilled in the art will recognize that lower magnetic field requirements can be met either by permanent magnets, normal (that is non-cryogenically cooled) electromagnets or by superconducting magnets. However, in applications where peak inductions greater than approximately 0.7 Tesla, are required it is likely that only superconducting solenoids will be appropriate for practicing the invention. At higher field strengths, normal electromagnets become excessively heavy and their power requirements become prohibitive in the context of spacecraft applications. On the other hand limited residual induction will preclude the use of permanent magnets in some extended duration applications of the invention.

In testing some prototype LDR configurations of the invention rare-earth permanent magnets of cobalt-samarium were used. Such magnets are commercially available from Hitachi Magnetics Corporation. A major advantage of such magnets is that they produce a strong magnetic flux field and they are mechanically simple and durable, so they can be readily designed to survive spacecraft launch accelerations and to survive for long periods in the environments of outer space. A primary limitation to the use of such rare earth magnets in various applications of the present invention in spacecraft heat rejecting systems is that their residual induction cannot, at the present time, be made to exceed approximately 0.8 Tesla. On the other hand, superconducting electromagnets allow for the production of intense magnetic fields. Flux fields can be produced as high as 8 to 10 Tesla and field gradients can be made as high as 72 Tesla per meter, with currently available commercially produced superconducting magnets. In applying superconducting magnets within embodiments of the invention designed for spacecraft applications, careful analysis of the electric current source and refrigeration requirements must be made to appropriately assess weight penalty tradeoffs.

From preliminary calculations made by the present inventors, it appears feasible that a dipole magnet with an induction of 0.5 Tesla at the bore center of a toroidally configured magnet having a diameter of about 1 meter, can be made to have an effective flux field collector diameter of about 2.3 meters, with an actual collector diameter of approximately 1.0 meter. This corresponds to a pointing error of about 23 m-radians, where a 1 meter diameter collector requires about 10 m-radian error. By increasing the induction of the bore center to 5.0 Tesla, the allowable pointing error increases to 57 m-radians. The former case corresponds to either a permanent magnet, normal electromagnet, or superconducting magnet, while the latter case corresponds to a superconducting magnet only. It should be noted that due to the slightly greater than 4 power dependence of the field gradient with position, the higher magnetic field does not provide proportionately greater tracking error. A major conclusion that is drawn from these calculations is that in applications where a spacecraft is to be maneuvered at accelerations much greater than $10^{-3}$ g, smaller, multiple LDRs may be required to best practice the invention. In such applications, the total LDR unit will then be more massive, but would also appear to be more likely to survive.

Figure 2:
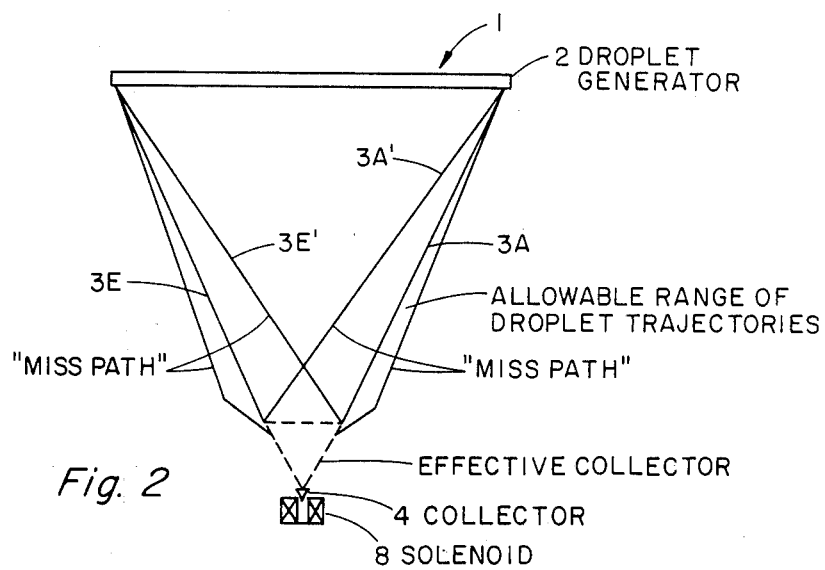
FIG. 2 is a schematic diagram of a liquid droplet radiator, showing the droplet generator and collector thereof in relation to a dipole magnet that produces a focusing force on droplets directed toward the collector, as illustrated by the outline pattern of droplets shown in the drawing.

Reference is now made to FIG. 2 of the drawing in order to further describe the magnetic focusing concept of the invention. There is shown in FIG. 2 a schematic diagram of an LDR 1, including a liquid droplet generator 2, a generally conically shaped collector 4, and a dipole toroidal electromagnet 8. In utilizing such components, according to the invention, they would be assembled in a suitable LDR operating arrangement such as that described above with reference to FIG. 1. As seen in FIG. 2, liquid droplet streams 3A and 3A' and 3E and 3E' are shown in relation to a dashed triangle having an apex at approximately the center of the collector 4. The purpose of this schematic diagram is to illustrate that the magnetic flux field generated by the magnet 8 is effective to focus liquid droplets in the streampaths 3A-3A' and 3E-3E' into the collector 4. Accordingly, it will be understood that the streams of droplets need not be precisely directed toward the center of the collector 4 in order to assure that they will be forced into the collector by the magnetic field flux of the magnet 8. In other words, an allowable range of droplet trajectories exists between the angles defined by the droplet streams 3A-3A' and the streams 3E-3E'. Such a permissible range of divergence in the flow paths of the streams of droplets has the advantage of enabling the use of a less rigidly mounted and directed droplet generator 2, and has the further saving of minimizing setup time for such an LDR.

Figure 3:
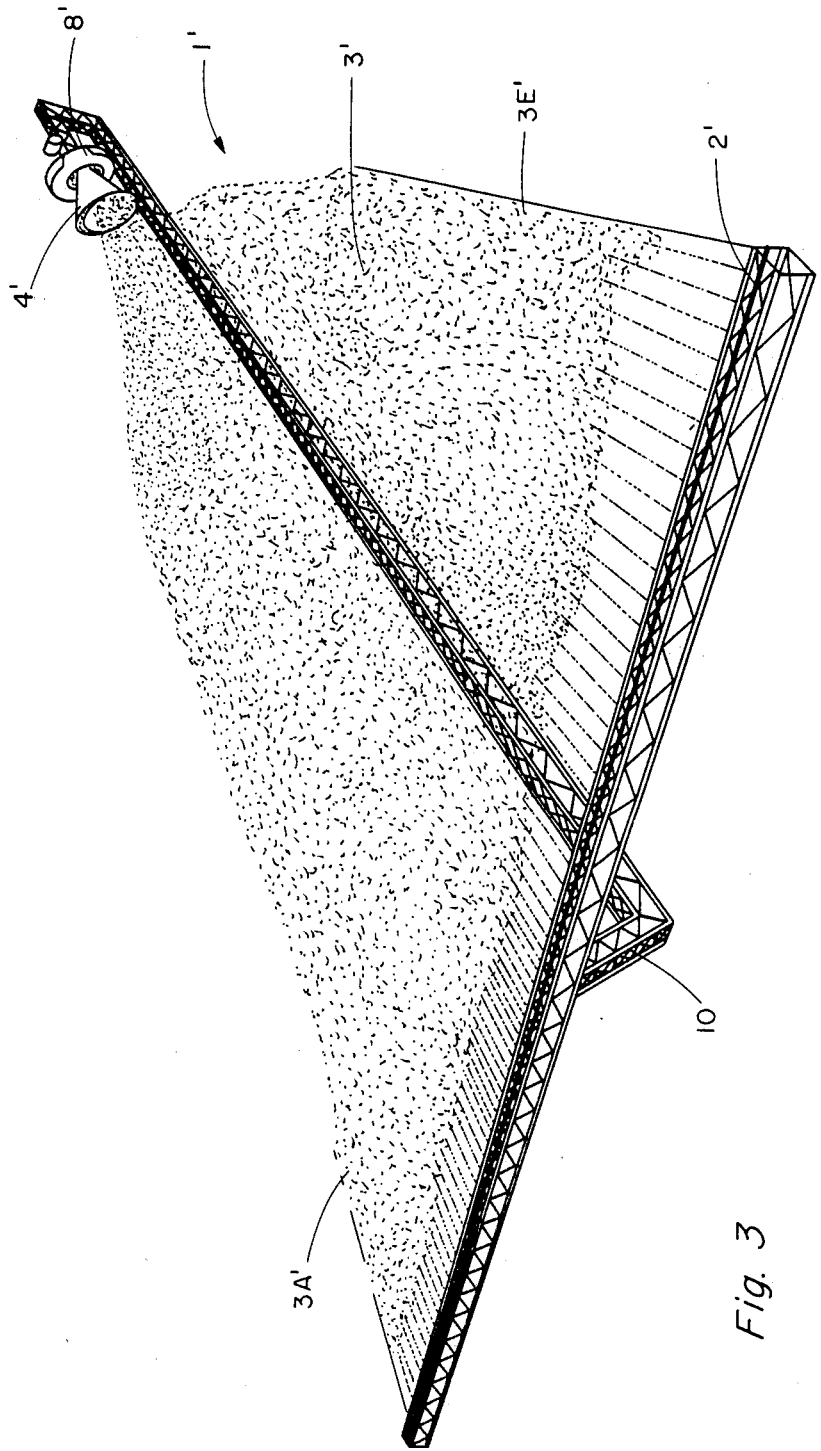
FIG. 3 is a perspective view of a large schematically diagrammed liquid droplet radiator having a toroidally shaped dipole magnet disposed around a relatively small liquid droplet collector according to the present invention.

In order to more graphically illustrate the magnetic focusing capability of the invention, reference is now made to FIG. 3 where there is shown a schematic diagram of a large LDR 1' of a type that is suitable for certain spacecraft applications. The liquid droplet generator 2' used in such an embodiment of the invention comprises a conventional pipe having suitable spaced droplet producing apertures along one side thereof. The generator 2' is supported by a suitable framework structure 10 that is mounted in spaced relationship to a generally conically shaped collector 4' around the hollow bore of which is disposed a large cryogenic toroidally shaped magnet 8'. As can be seen in FIG. 3, the droplet sheet 3' is sharply focused by the magnetic flux field produced by the toroidal magnet 8', as the droplet streams in the sheet 3' approach the collector 4'. Accordingly, rather than following the generally straight line paths indicated by the lines projected at the outer boundaries of the sheet 3', for the purpose of better illustrating this effect, it can be seen that the droplet streams are accelerated inward toward the bore of the collector 4'.

Figure 4:
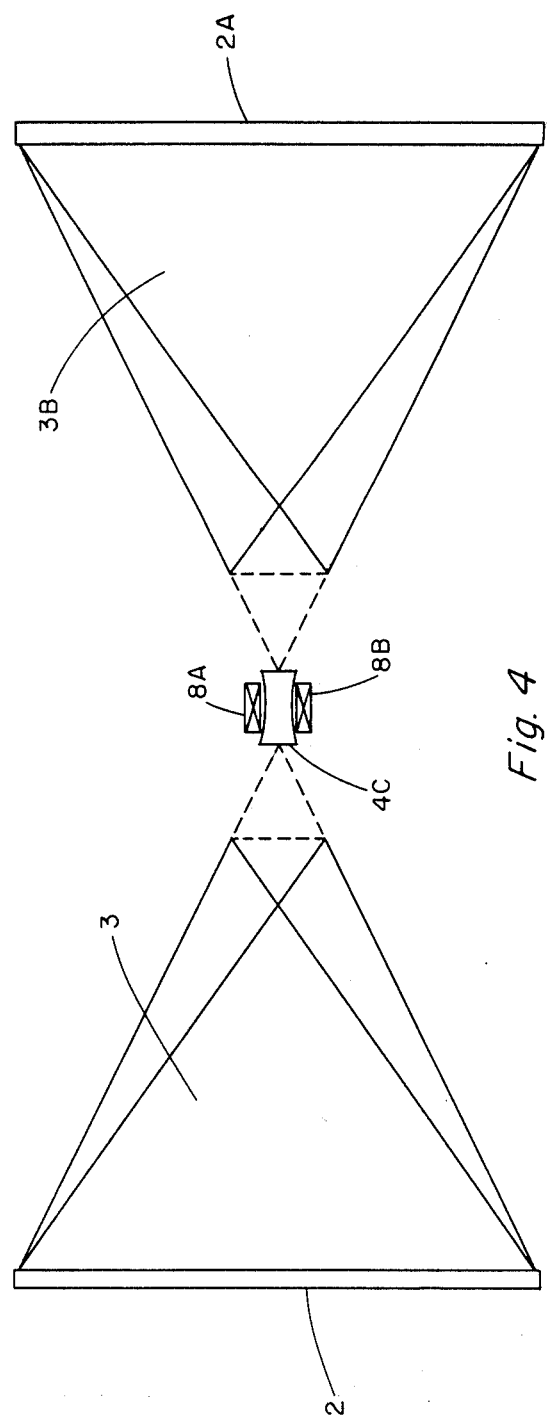
FIG. 4 is a schematic diagram of a liquid droplet radiator system having two liquid droplet generators disposed on opposite sides of a relatively small droplet collector, which is surrounded by a dipole toroidal magnet. The magnet operates to focus both sheets of droplets directed toward the opposite ends of the collector from the respective droplet generators, thereby to focus the droplets in the controlled patterns generally illustrated in the drawing.

FIG. 4 of the drawing illustrates another embodiment of the invention that demonstrates further advantages of it. In the embodiment shown in FIG. 4, a single double-ended droplet collector 4C is mounted between a pair of droplet generators 2 and 2A, which are respectively operable to direct streams of droplets toward the collector 4C in the illustrated droplet sheets 3 and 3B. For the sake of clarifying the explanation of the invention, the configuration of the droplet sheets 3 and 3B are shown as generally similar to the droplet sheet defined by the droplet streams 3A-3A' and 3E-3E' in FIG. 2 of the drawing.

In the embodiment shown in FIG. 4, the magnetic means 8A and 8B comprise permanent dipole magnets that are positioned respectively with their poles in planes that generally parallel the central longitudinal axis of the collector 4C. It should be apparent that the magnets 8A and 8B can also be arranged in other configurations relative to the collector 4C, but such variations in the orientation of the magnets will produce a corollary variation in the configuration of their magnetic flux fields relative to the bore of the collector. As shown in FIG. 4, the opposite ends of the collector 4C are each made generally conical in configuration with the larger outer ends thereof facing the respective droplet generators 2 and 2A. Accordingly, the central longitudinal axis of the collector is arranged approximately parallel to the streams of droplets that are directed toward it from the respective centers of the droplet generators 2 and 2A in this embodiment of the invention.

In the FIG. 4 embodiment, as well as in the embodiments of the invention discussed above with reference to FIGS. 1-3, the droplet generators 2, 2A, etc. are made to be operable to form a plurality of streams of droplets 3A-3E, etc. that are arranged in a generally straight line defined by the straight configuration of the droplet generators. Thus, the resultant sheets of droplets 3 or 3B are disposed in generally common planes. It should be understood that in other embodiments of the invention droplet other generators, in lieu of the generators 2 or 2A, can be made in other configurations, such that an undulating sheet of droplets is formed, or such that a generally circular, square or other geometric configuration of droplets is directed from the generator toward the collector(s) in a suitable alternative LDR configuration. Thus, it will be appreciated that in practicing certain embodiments of the invention a magnetically focused LDR having a generator for generating directed streams of magnetizable liquid or slurry can be formed to cause those streams to flow in a predetermined flow pattern toward an associated collector spaced from the generator by suitable structure, such as by the framework 10 shown in FIG. 3. In all embodiments of the invention it is important that the magnetic flux field generated by the magnet means, such as by magnet means 8, 8' or 8A-8B shown in the various drawings discussed heretofore, be effective to accelerate streams of magnetizable liquid or slurry droplets to move them inward from those flowpath areas that are outward from the collector 4. Such inward movement must be sufficient to cause the streams that would otherwise miss the collector, except for the focusing effect of the magnetic means, to be directed into the collector. Such strong flux fields enable the magnetic means to appropriately focus the streams of droplets and direct them into the accelerator.

In order to assess how magnetic focusing and liquid droplet collection that is performed according to the present invention affects the weight of a LDR system, some trade-off studies were conducted by the present inventors. In these studies three options were examined: (1) a large collector for a non-magnetic LDR; (2) an LDR with magnetic focusing, and (3) a closed heat pipe energy rejecting system with a specific weight of 10 kilograms per square meter of rejecting surface (10 $Kg/m^2$). For magnetic LDR's, the acceleration of liquid droplets toward the collector of the system was found to be on the order of 1 to 10 meters per second per second for droplets at the extreme outer edges of the droplet sheet (3, above), assuming a maximum distance from the center of the collector of about 1.5 times their "miss path" distance (as shown in FIG. 2).

Figure 5:
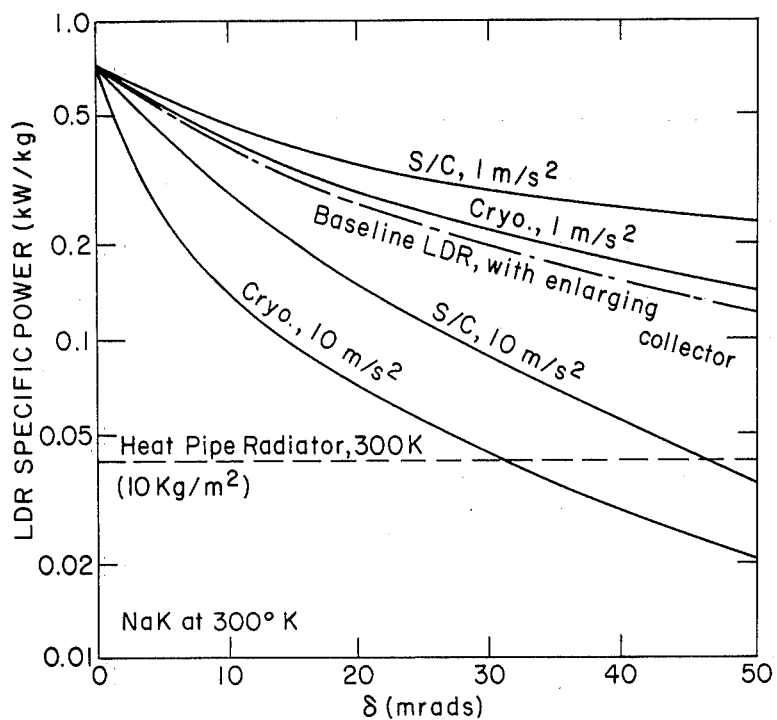
FIG. 5 is a graph showing variations of specific power in a liquid droplet radiator as a function of droplet sheet divergence angle, with the respective plotted curves being related to different magnet technologies and required accelerations. The liquid droplets in the system tested to produce these results were formed of commercially available NaK.
Figure 6:
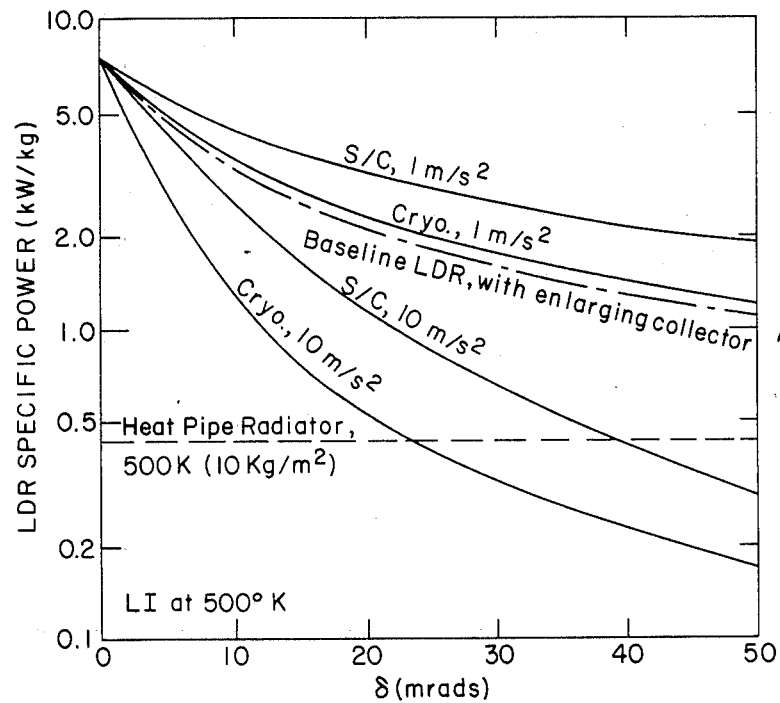
FIG. 6 is a graph on which the same functions as those described relative to FIG. 5 are plotted, but which is based on test results that were obtained in a liquid droplet radiator utilizing liquid lithium, rather than NaK.

Two different working fluids and temperatures were chosen for those investigations. Specific power values for a non-magnetic LDR were obtained and those radiators were taken to be the base-line design. No magnets were used in those LDRs and it was assumed that a magnetic LDR behaves identically to a conventional LDR, except for the addition of magnets and associated magnetizable liquid or slurry. FIGS. 5 and 6 of the drawing show variation in the base-line specific power as the result of a larger collector. FIG. 5 shows the variation for a NaK LDR specific power with droplet sheet divergence angle for different magnet technologies and required accelerations. Superconducting magnets have a smaller weight penalty, as do lower required droplet accelerations. As the divergence angle of the droplets from the "mispath" increases, the distance over which the droplets must be accelerated to assure successful entry into the collector (4) increases. In order to do this, the flux field of the magnetic means (8) must increase, as must the weight of an associated electromagnet producing such a field.

As a means of comparison for these tests, equivalent results obtained from a closed heat pipe radiator are also shown on the plot of the graph in FIG. 5. For the lower bound of one meter per $sec.^2$ accelerations out beyond 50 milliradians divergence, the droplet radiator shows a clear performance advantage regardless of magnetic technology. At the higher acceleration limit, the LDR has a performance advantage out to roughly 30 milliradians with a cryogenically-cooled (cryo.) aluminum magnet, and to roughly 45 milliradians with a superconducting (s/c) magnet.

FIG. 6 shows test results that are plotted on a graph of data obtained from tests performed with a higher temperature LDR, using liquid lithium as the magnetizable fluid therein. As shown in FIG. 6, cryogenically cooled magnets offer a performance advantage over heat pipes below roughly 25 milliradians, while a superconducting magnet increases the angle to about 40 milliradians. At the lower acceleration level, a clear performance advantage still exists for all magnet technologies relative to the heat pipe radiator, well beyond 50 milliradians.

From the foregoing disclosure of the invention it will be apparent that various further alternative embodiments and combinations of arrangements of the features of the invention can be developed in order to best practice the invention in given applications. For example, although the droplet forming jet orifices used in the droplet generators 2, 2A, etc. of the various embodiments of the invention described above were found to perform well with bore diameters of either 100 or 150 microns each, it is believed that smaller orifice diameters will perform equally well with suitable ferro-fluids or magnetizable slurries. In some of the tested prototypes of the invention the droplet forming jets were fabricated by drilling apertures directly in the tube walls of the droplet generators 2, also, pre-drilled sapphire orifices obtained commercially from Flow Industries, Incorporated were mounted in offset bores formed in the walls of some such droplet generators (2). Similarly, in various tests of prototypes of the invention, a piezoelectric oscillator was used to vibrate an associated droplet generator (2) by driving the piezoelectric transducer at about 1500 to 2500 hertz. Clearly, other driving frequencies, and resonators, can be used in other applications of the invention. Likewise, the pressure at which liquid droplets are forced from the droplet generator (2) toward an associated collector (4) can vary widely in different applications, but in some of the tests performed on prototypes of the invention, suitable droplets sheets (3) were formed using pressures between 10 psia and approximately 50 psia for directing droplets having 100 micron particle sizes toward a collector (4). It was found that once the droplet flow has been established, substantially lower pressures are needed to maintain the flow of droplet streams.

What is claimed is:

1. A liquid droplet radiator having a droplet generator for producing directed streams of droplets, a collector spaced from the generator to collect the streams of droplets directed toward it from the generator, and fluid handling means for withdrawing fluid from the collector and delivering it to the generator under pressure, in combination with the improvement comprising a magnetizable liquid or slurry in said generator and in said means for withdrawing and delivering liquid, and magnetic means disposed in operative relationship to said collector for producing a magnetic flux field that extends into areas located transversely outward from the straight-line droplet stream "miss" path beyond the collector and is effective to focus and accelerate said streams of droplets, thereby to direct them from said areas into said collector.

2. An invention as defined in claim 1 wherein said magnetizable liquid is a ferrofluid or a slurry containing ferrite particles, and wherein said magnetic means comprises a toroidally shaped electromagnet that is disposed around said collector and in a generally coaxial relationship therewith.

3. An invention as defined in claim 1 wherein said magnetic means comprises at least one permanent magnet.

4. An invention as defined in claim 3 wherein said magnetic means comprises a plurality of dipolar permanent magnets, respectively disposed in spaced relationship to one another in an arrangement of magnets that at least partly surrounds said collector.

5. An invention as defined in claim 4 wherein each of said magnets is positioned with its poles in a plane that generally parallels the central longitudinal axis of said collector.

6. An invention as defined in claim 5 wherein said collector is generally conical in configuration, and the larger end thereof faces said generator, thereby to position the central longitudinal axis of the collector about parallel to the streams of droplets directed toward it from the center of said generator.

7. An invention as defined in claim 6 wherein said generator is operable to form a plurality of streams of liquid droplets, said streams being arranged in a generally straight line, whereby said streams are disposed in a generally common plane.

8. An invention as defined in claim 4 wherein said magnets each comprise rare earth magnets.

9. An invention as defined in claim 1 wherein said magnetic flux is effective to supress splashing of said droplets when they engage said collector.

10. An invention as defined in claim 1 wherein said magnetizable droplets comprise a ferrofluid.

11. An invention as defined in claim 1 wherein said magnetizable droplets comprise a slurry containing ferrite particles.

12. A magnetically focused LDR having a generator for generating directed streams of magnetizable liquid or slurry into a predetermined flow pattern, a collector spaced from the generator, said collector being effective to collect streams of liquid or slurry directed toward it from the generator in said flow pattern, and means for withdrawing said liquid or slurry from the collector and for delivering it to the generator under pressure, in combination with the improvement comprising a magnetizable liquid or slurry disposed in operative relationship within said generator and said means for collecting and delivering said liquid or slurry, and magnetic means mounted adjacent to said collector to produce a magnetic flux field that extends into areas transversely outward from the central axis of the bore of the collector, and into the "miss paths" of liquid droplets, said flux field being effective to accelerate streams of liquid or slurry droplets to move them from said "miss path" areas that are outward from the collector, thereby to focus essentially all of the streams and direct them into the collector.

13. An invention as defined in claim 12 wherein said magnetic means comprises a cryogenically cooled toroidal shaped electromagnet that is disposed around a generally conical section of said collector.

14. An invention as defined in claim 12 wherein said magnetic means comprises a plurality of cobalt-samarium magnets positioned, respectively, adjacent to the outer walls of said collector.

15. An invention as defined in claim 14 wherein said outer walls of the collector are generally frusto-conical in shape.

16. An invention as defined in claim 15 wherein said walls of the collector are formed of non-magnetic material.

17. An invention as defined in claim 14 wherein said walls of the collector are formed of magnetic material.

* * * * *